United States Patent
Meredith (10) Patent No.: US 8,272,659 B2
(45) Date of Patent: Sep. 25, 2012

(54) BIKE HAVING INDICIA INSERT FOR DISPLAY OR ADVERTISING

(76) Inventor: Jeffrey Owen Meredith, Del Mar, CA (US)

(*) Notice: Subject to any disclaimer, the term of this patent is extended or adjusted under 35 U.S.C. 154(b) by 0 days.

(21) Appl. No.: 13/187,464

(22) Filed: Jul. 20, 2011

(65) Prior Publication Data

US 2012/0019019 A1   Jan. 26, 2012

Related U.S. Application Data

(60) Provisional application No. 61/366,054, filed on Jul. 20, 2010.

(51) Int. Cl.
*B62J 99/00* (2009.01)
*G09F 21/04* (2006.01)

(52) U.S. Cl. ............... 280/288.4; 40/590; 40/606.02

(58) Field of Classification Search ............ 280/288.4; 40/584, 590, 606.01, 606.02; 296/21
See application file for complete search history.

(56) References Cited

U.S. PATENT DOCUMENTS

| | | | | |
|---|---|---|---|---|
| 3,945,336 | A * | 3/1976 | Harris | 116/28 R |
| 4,115,942 | A * | 9/1978 | Sears | 40/547 |
| 6,910,703 | B1 * | 6/2005 | Hamilton | 280/288.4 |
| 2006/0005440 | A1 * | 1/2006 | Young et al. | 40/590 |
| 2009/0031600 | A1 * | 2/2009 | Anderson et al. | 40/606.03 |

* cited by examiner

*Primary Examiner* — Tony Winner
(74) *Attorney, Agent, or Firm* — Donn K. Harms (57) ABSTRACT

A bicycle frame for employment in a bicycle for riding by a user in a substantially vertical as-used position. The frame has a shape which defines an aperture within the interior surface of a surrounding frame. The frame is preferably formed of planar material which has ends which do not block the view into the aperture when the bicycle is ridden. Whereby space for indicia on an inserted vertically disposed planar member is maximized. The planar member has a perimeter defining a shape that is complimentary to the shape of the aperture and when engaged therein provides support to the frame to prevent deformation thereof when in the as-used position under a load. The indicia positioned on the planar member may be advertising which can easily be changed using removable planar members with different indicia.

18 Claims, 6 Drawing Sheets

BIKE HAVING INDICIA INSERT FOR DISPLAY OR ADVERTISING

This application claims priority to U.S. Provisional Application Serial Number 61/366,054 filed on Jul. 20, 2010, and incorporated herein by reference in its entirety.

BACKGROUND OF THE INVENTION

1. Field of the Invention

The invention herein disclosed relates generally to the art of bicycles. More particularly, it relates to a bicycle having a frame adapted for inclusion of a panel bearing indicia for advertising or decoration or both.

2. Prior Art

Bicycles have been a favored mode of transportation throughout the world for decades. Riders of bicycles the world over employ them for transportation to work and shopping. In addition to such basic transportation, bicycles are frequently employed for recreation and used in conjunction with the rider's course of employment.

In the case of recreation, bicycles are ridden in races, over mountain trails, in packs of riders associated with each other or a common group, and simply for leisure riding such as when on vacation and exploring the rider's vacation venue.

In cases of recreational and vacation biking for instance, frequently travelers will rent bicycles during their stay at a location on a trip. Or, they may be staying at a hotel or resort that provides bicycles to guests where they can reserve a bicycle and ride through the resort or surrounding area.

In spite of their popularity, bicycles have heretofore been under utilized in the area of advertising and signage. This is most probably because the structure of a conventional bicycle affords little area for the placement of decoration and indicia to accomplish such. Conventionally, bicycles are made from a tubular or similar frame to which a plurality of axles are operatively engaged to allow for the operative engagement of wheels to the frame.

Such frames being generally formed of a tubular frame, and configured to support the rear drive wheel in an operative communication with a front steering wheel, offer little actual area on which to place indicia for advertising or other purposes. The diameter of the tubes forming the frame are conventionally kept small in order to keep the ultimate weight of the bicycle low, to aid the rider. On some bicycles there is a crossbar which can be made of a larger surface area for decorative purposes. However on others, no such crossbar is provided or if provided, it is small in diameter and surface area.

As a general rule, the surface of the tubing forming this frame is painted in colors the rider finds attractive, and small amounts of indicia concerning the manufacturer of the bike and the model may be imprinted or otherwise imparted to portions of the small surfaces of the exterior of the tubing forming a frame. In cases where the frame has, for instance, a one inch diameter tube, the visible exterior surface area, when seen from one side of the bike, is very small. Half to a third of a curved external area inhibits the placement of advertising thereon.

As a consequence of this conventional mode of manufacture and sale of bicycles with small tubing and minimized external indicia bearing surfaces, the millions of riders in cities and resorts around the world, are afforded little if any means to advertise or decorate any large area of their bicycles in a fashion which may be readable from a distance by third parties. For example, a bicycle frame formed of oversized tubing having a 2-inch diameter will yield an indicia bearable entire surface of the circumference surface area of substantially 6 inches. Only half of that area at best, is visible by a third party viewing it from a position aside one side of the bicycle. Further, the curve of the tubing further limits the viewable surface area for indicia or decoration which may be viewed. Using the above 6-inch circumference, at best the indicia or lettering may be 2-3 inches tall since half the circumference is 3 inches across and curved.

Bicycles have been known to have signage bolted to the frame or the handlebars to overcome this surface area dilemma. However, such signage causes wind resistance, and can be dangerous to the rider if it projects above the handlebars or the horizontal cross bar of the frame. Other signage is known to use the front or rear axle as a mount for signage engaged at the opposite end of the mount from the axle. However, such a mounting system places placards or signage in the rider's view and if located above the front axle on a member, can severely effect steering due to wind loads on the signage, multiplied by the length of the member supporting it.

As a consequence, advertising and decoration of bicycles has been under utilized. In cases, for instance, when a resort is providing the bicycles to guests, tasteful signage or logo decoration of a size that can be read by third parties, twenty or thirty feet away from the bicycle on a sidewalk, would serve to advertise the resort as the riders move about the roads surrounding the resort. Such could increase business and help offset the cost of buying and operating the bicycles for guests. Further, bicycle owners if given larger areas to impart decorative indicia to bicycles, in a manner that would not be effected by wind load or weight, could customize their bicycles with indicia bearing text, art and designs of the choosing, that may be seen and discerned by third parties from a distance. Unfortunately, the tubular construction of conventional bicycles does not afford such utility.

The present invention solves the aforementioned shortcomings of the prior art of bicycles having tubular constructed frames. The frame on the disclosed device and method herein, is formed of one or a combination of planar metal sections or tubular metal sections so as to be easily adapted into conventional manufacturing of bicycle frames. However, the frame so formed, is also mechanically configured to surround and engage a removable or permanently mounted planar member which may be decorated with indicia to yield advertising, or decorative designs or both. The size shape and contour of the planar member affords the opportunity to place indicia thereon, in a size and in designs or with art, which may be read or otherwise discerned by viewers many feet from the bicycle.

With respect to the above, before explaining at least one preferred embodiment of the bicycle having a frame adapted for engagement of planar members bearing indicia, in detail or in general, it is to be understood that the invention is not limited in its application to the details of construction and to the arrangement of the components or the steps set forth in the following description or illustrated in the drawings. The various apparatus and methods of the disclosed bicycle related invention are capable of other embodiments, and of being practiced and carried out in various ways, all of which will be obvious to those skilled in the art, once the information herein is reviewed. Also, it is to be understood that the phraseology and terminology employed herein are for the purpose of description and should not be regarded as limiting.

As such, those skilled in the art will appreciate that the conception upon which this disclosure is based may readily be utilized as a basis for designing other modes of engaging large planar sections to bicycle frames, in line with the frame to not affect balance, for indicia placement thereon, and for carrying out the several purposes of the present disclosed device and method. It is important, therefore, that the embodiments, objects and claims herein, be regarded as including such equivalent construction and methodology insofar as they do not depart from the spirit and scope of the present invention.

SUMMARY OF THE INVENTION

The disclosed device and method provide a solution to the above noted shortcomings of conventional bicycle frames which lack sufficient surface area for display of indicia of a size which may be discerned from a distance. In the disclosed device formed by the disclosed method herein, the bicycle frame may be formed of tubular or planar metal or composite sections in a substantially conventional configuration.

However, instead of leaving the large area of space in the frame between the seat and the rotating pedals empty, the disclosed device provides a frame configured for permanent or removable engagement of a large planar member. The planar member, engaged along the axis of the frame, will thus not effect the balance of the frame during use like components engaged traverse to the axis of the bicycle.

Indicia including one or a combination of text, color, design, art, and symbols may be imparted to this planar portion, in vertical sizes which can be easily discerned or read by pedestrians and motorists viewing the bicycle from a distance on one side or the other. Since generally bicycles ride in the street or in bike lanes, and third party viewers tend to be on sidewalks or in cars distant from the bicycle, unlike the small print on the surface circumference of the conventional frame tubes, the indicia on the disclosed planar member can be sized sufficiently large to be seen and understood by those distant viewers. Further, in some modes of the device herein, the planar member can be adapted to engage the surrounding tubing or frame members in a fashion to increase the strength of the frame, in addition to providing a large surface area for indicia of increased size from that of the frame. Additionally, the large planar members can be configured for a removable engagement with the frame and be from a kit of a plurality of such planar members having different indicia on each kit member. This allows for easy changing of the indicia, for instance, during the day of a race or event where riders could function as moving information signs with changing information provided by changing the indicia-laden planar members engaged to the rider's frame.

In the disclosed device herein, the indicia imparted to the planar member may be printed, silkscreened, applied using a decal, engraved, or in an especially preferred mode due to durability, the indicia may be laser or otherwise cut to communicate through the planar member to yield open areas which will appear as the indicia in shapes, letters, numbers, and other designs desired.

As an example, if the bicycle is to be used by guests at a hotel, the name of the hotel and/or the hotel logo can be placed on the planar member. If paint or decals are used, it is simply adhered in the desired spot. But if the designs are cut into the planar member, they become non-removable by abrasion and weather and easily discerned by the viewer at a distance since light will communicate through apertures in the planar member which is more easily discerned by the eye.

If the planar member is welded in place permanently, the indicia not only serves to advertise, but also as a theft-deterrent. This is because the indicia identifies the hotel which is the owner of the bicycle, and can be read from a substantial distance, and since it is laser cut as apertures through the planar member, it is not easily modified. Since it can be welded in place, this makes it extremely hard for a thief to alter the indicia such that it would not identify the owner. Rather than risk being caught, or having to perform extensive modification to the bicycle to remove the planar member, thieves will seek other bicycles to steal which are less trouble subsequent to the heist.

In all modes of the device, the planar member is preferably engaged within the formed tubular frame, between the seat and the pedals, aligned with the tubular frame, to maintain the balance of the frame during use. Heavier portions of the planar member might be placed in lower positions near the pedals to aid in balancing the frame for cornering or riding in general and offset the mass of the opposite end of the planar member mounted higher.

It is an object of this invention to provide a bicycle with a large planar area for placement of indicia thereon which may then be sized sufficiently large to be read by third parties many feet from the moving bicycle.

It is another object of this invention to provide such a device and method for a bicycle which allows for owners to customize the decoration or indicia thereon to their intent, be it decorative or commercial advertising.

Finally, it is an object of this invention to provide such a bicycle having a large planar member which may be permanently engaged or adapted for removable engagement to allow for frequent changes of the indicia displayed by the bicycle during a day or week or other time frame.

It is a further object of this invention to provide such an engageable indicia bearing component, which is engageable in a fashion to minimize the balance of the frame during riding or even enhance the balance of the frame for riding.

These together with other objects and advantages which become subsequently apparent reside in the details of the device and method for forming bicycle frames herein as more fully hereinafter described and claimed, reference being had to the accompanying drawings forming a part thereof, wherein like numerals refer to like parts throughout.

DETAILED DESCRIPTION OF THE PREFERRED EMBODIMENTS OF THE INVENTION

Figure 1:
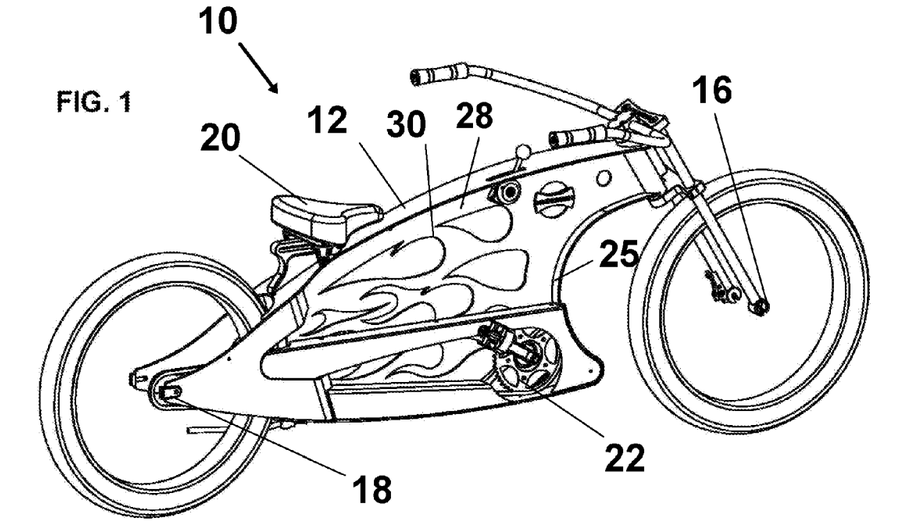
FIG. 1 is a view of the disclosed device herein as a complete bicycle having a frame formed of horizontally disposed sheet metal components and a vertically disposed planar member either permanently or removably engaged by the surrounding frame.

Referring now to the FIGS. 1-11, where similar components are depicted with the same numerals, the device 10 is shown in a fully assembled operative fashion in FIG. 1. The device 10 features a frame 12 formed of one or a combination of tubular or preferably sheet metal, or planar or tubular composite sections in a substantially conventional bike frame configuration. As shown in the drawings, and particularly preferred in all modes of the device 10 the frame 12 is formed of planar sheet metal, or planar formed composite. The sheet metal forming the frame 12 is substantially horizontally disposed when the frame 12 is being ridden by a rider in the as-used position where it would be upright as in FIG. 6.

The employment of planar sheet metal for the frame components 12a-12d which are operatively engaged with the vertically disposed planar member 28 and support struts form the frame 12 of sheet metal, yielding a very stable, yet easily mass-produced frame structure. The use of sheet metal for the frame 12 formed of components having planar side edges running normal to the surface of the planar member 28 when in the as-used position, also yields a much larger aperture 23 for insertion of a planar member 28 therein.

Further, being planar with no curvature, the planar frame 12, unlike tubing, does not have a surface curve or roll to hide portions of the planar member 28 from a viewing from the side. However, for the advertising mode of the device where a larger size is not imperative, a conventional tubular frame can be used which takes advantage of the planar member 28 for indicia, in a less preferred mode of the device 10.

The assembled bicycle frame 12 from sheet metal components, similar to the conventional tubular frame shown in other drawings, provides engagement for a steering axle 16 and drive axle 18, and a seat 20 and a pedal 22. The frame 12 formed of bent or cut or stamped planar components 12a-12d and supports as needed and shown, so configured, forms a frame aperture 23 (FIG. 7) defined by the perimeter 25 of the frame 12.

Figure 2:
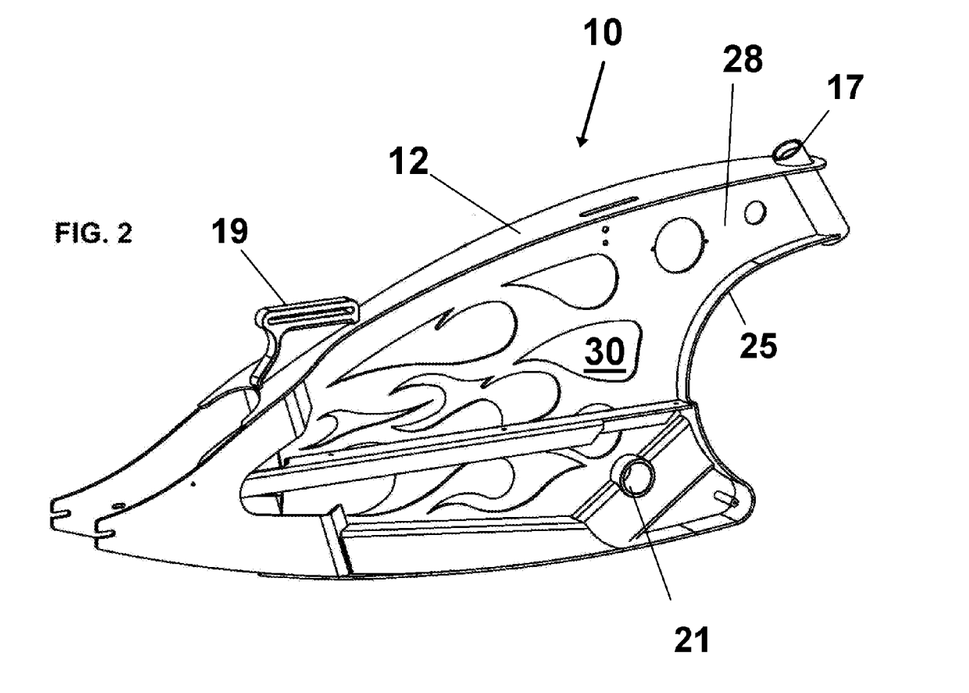
FIG. 2 is a view of the frame only from the device of FIG. 1 showing the planar member with indicia thereon surrounded by the engaged frame.

The planar member 28 has a perimeter edge 27 (FIG. 3) configured and shaped to operatively engage in a substantially mirrored shape of the frame aperture 23 defined within the perimeter of the frame 12 and in the same plane as the aperture as is shown in the engaged mode in FIG. 2. This positioning, when the device is bearing weight in the as-used position, provides a vertically disposed support member to maintain a frame 12 formed of horizontally disposed planar components, in its original shape rather than bending as such planar sheet metal or composite may be prone to do under a load. Also shown are the steering mount, seat mount 19 and pedal mount 21. Using sheet metal components to form the frame 12 as noted yields a larger frame aperture 23 which work in a symbiotic relationship with the inserted frame member 28 to provide diagonal and shear support to the assembled frame 12 when engaged in the aperture 23.

Figure 3:
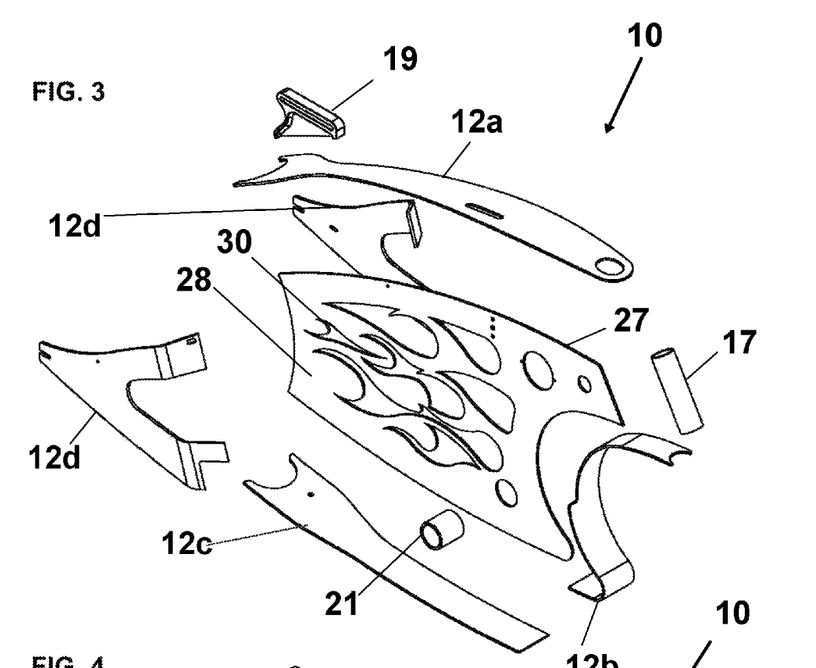
FIG. 3 is an exploded view of the basic component parts forming the frame from horizontally disposed planar components and the planar member configured to engage within the aperture defined by the frame of the assembled components.

Shown more clearly in FIG. 3, depicting an exploded view of the planar sheet metal or component frame 12, indicia 30 may be imparted to the planar member 28 preferably sized to be easily discerned or read by pedestrians and motorists viewing from a distance. The planar member 28 as shown is centered in position between the two opposing horizontally disposed edges of the assembled frame components forming the frame 12. In addition to providing a vertically disposed support and shear support to the frame 12 centering in the plane of the aperture between the edges of the frame, thereby does not effect balance in the as-used position of FIG. 6, and can enhance balance by a weighting of the lower end of the planar member 28 closer to the pedals.

In some modes of the device 10 herein, the planar member 28 is adapted to engage the surrounding frame 12 in a fashion to increase the strength of the frame 12, such as would a gusset, in addition to providing the large surface area for indicia 30 thereon. This shear and load support from the planar member 28 imparted to the surrounding frame 12 provides great utility in that assembled frame 12 so constructed of components of bent planar sheet metal which may be cut thinner and lighter, or planar composite sections 12' of such light weight, maintains structural rigidity and strength.

Figure 4:
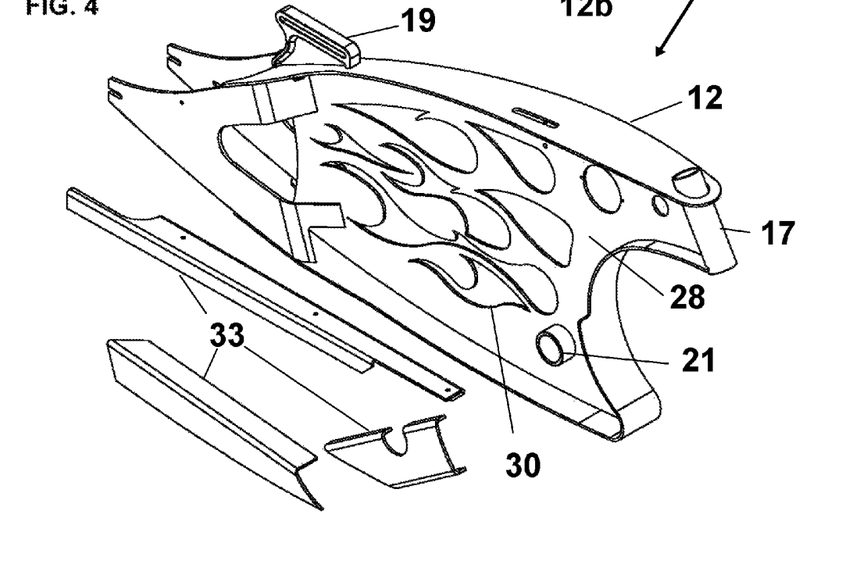
FIG. 4 is an exploded view of frame components of FIG. 3 engaged to and around the planar member and reinforcing gussets which may be provided to counteract the torque loads placed on the frame when a rider is pedaling.
Figure 5:
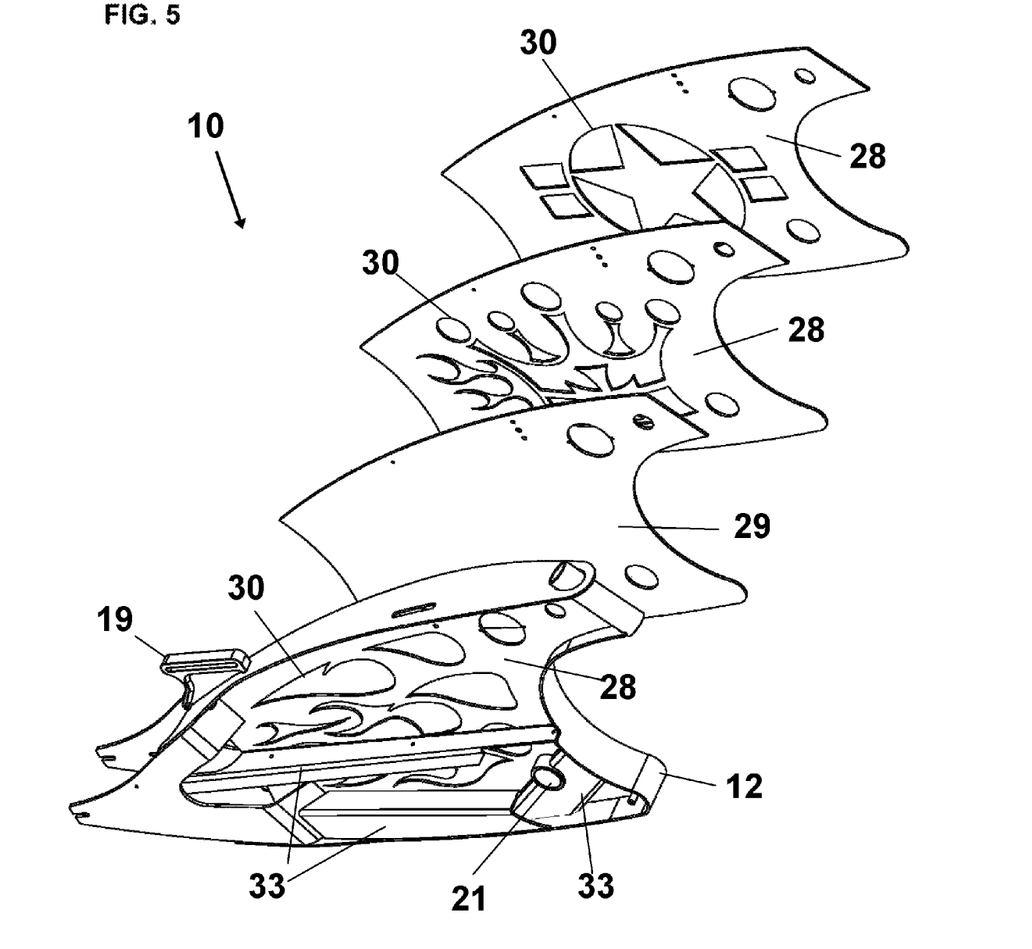
FIG. 5 depicts a view of the frame showing a plurality of planar members which have perimeters defining shapes adapted to engage within the formed frame. An infinite number of designs and indicia may be employed so long as the perimeter of the planar member defines a frame-engageable shape.

Further, if added structural rigidity and strength is needed, the frame 12 formed of planar members of metal or composite, may additionally also employ reinforcing gussets 33 provided to counteract the angled forces and loads placed on the frame 12 when a rider is pedaling in the as-used position. This is shown in FIG. 4, showing the gussets 33 exploded from the planar member 28 engaged to the frame 12. Such gussets 33 are provided to counteract the torque loads placed on the frame by the riders feet and weight when a rider is pedaling, and are preferably disposed at or near the pedal mount 21. However, these gussets can be employed anywhere as needed for effective reinforcement.

The indicia 30 imparted to the planar member 28 may be one or a combination of indicia from a group including indicia which is printed, silkscreened, applied as a decal, engraved, or in an especially preferred mode due to durability, the indicia 30 may be voids formed in the planar member 28 such as by laser cut or otherwise cut to communicate through the planar member 28 as in FIGS. 1-5. The indicia can include one or a combination of text, symbols, cutouts, color and other indicia as would occur to those skilled in the art. Again the preferred mode provides added utility in that the indicia 30 can be read from a substantial distance, and since it is laser cut as apertures through the planar member 28, it is not easily modified. Employed with the planar component, the assembled frame 12 maximizes the area of the planar member 28 for display while taking advantage of the support therefrom to the frame.

Figure 6:
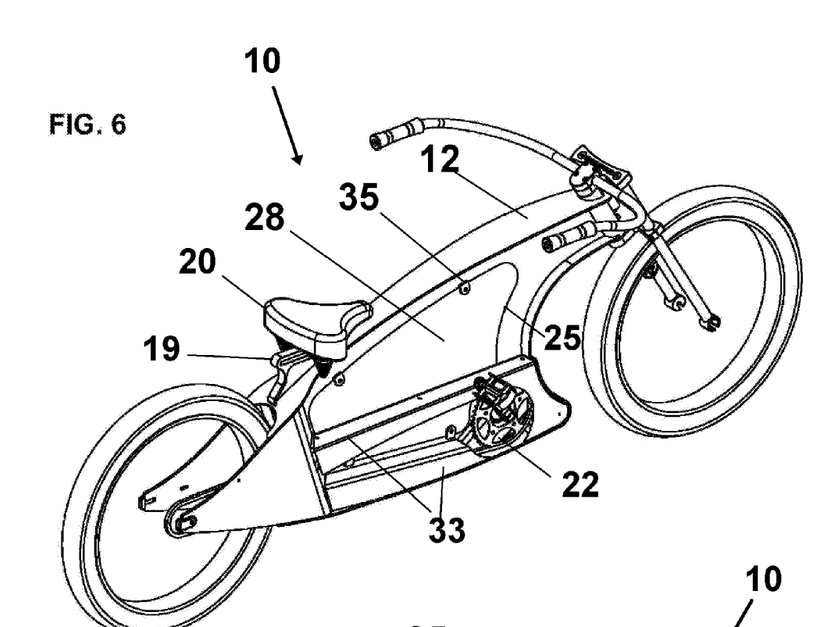
FIG. 6 is a view of the frame with wheels and other components engaged, and showing means for removable engagement of the planar member within the frame.
Figure 7:
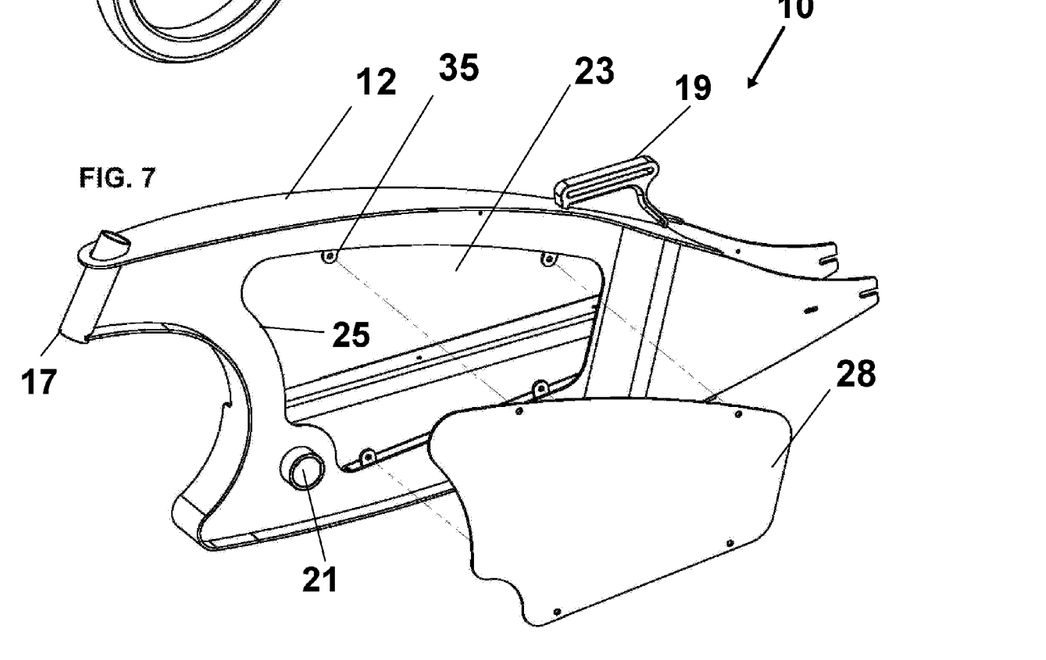
FIG. 7 is a view of the frame shown in FIG. 6 more clearly showing one removable means of engagement of the planar member within the surrounding frame.

The planar member 28 may be permanently engaged to the frame 12 by welding or may be adapted for a removable engagement employing appropriate fasteners 35 as in FIGS. 6-7, such as screws, bolts, magnets, hook and loop fabric, or combinations thereof or other fasteners as would occur to those skilled in the art. In addition, the planar members 28 may be from a kit of a plurality of the planar members 28 with each member of the kit bearing different indicia 30 as in FIG. 5, or may be simply a single design if permanently attached.

The removable mode with a kit of indicia bearing members allows for changes in the indicia and message over a short or long period of time such as at races or civic events to provide current timely messages to attendees.

FIG. 6 and FIG. 7 show an additional preferred mode of the device 10. The frame 12 is shown employing means for removable engagement of the planar member 28 within the aperture 23 formed by the perimeter 25 of the interior surfaces of the frame 12. Means for removable engagement include appropriate fasteners and mounts 35 such as screws, bolts, magnets, hook and loop fabric, or combinations thereof or other fasteners as would occur to those skilled in the art. Such removable engagement allows the user to replace the planar member 28 with different planar members 28 employing different indicia 30 as desired. In this mode the planar member 28 engaged in multiple locations around the aperture, may still provide the added structural rigidity and strength to the frame 12.

Figure 8:
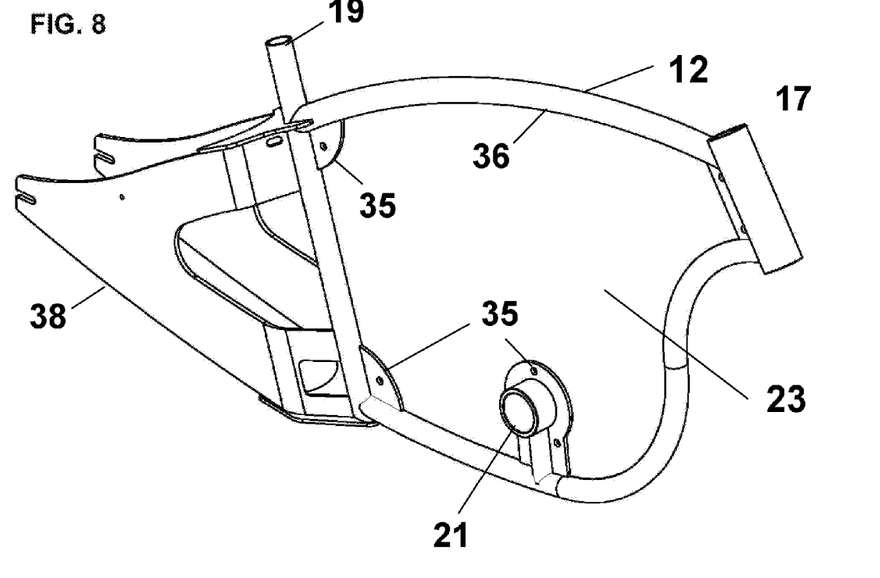
FIG. 8 is a view of a hybrid mode of a frame using conventional round or square tubing construction in the front and sheet-metal frame sections in the back.
Figure 9:
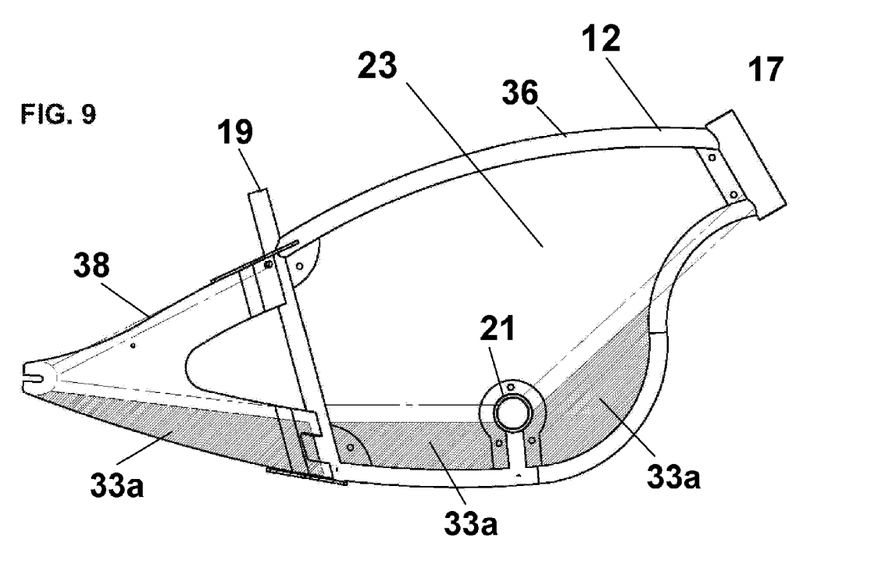
FIG. 9 is a side view of the hybrid frame of FIG. 8 using dashed lines to illustrate where tubing is normally used in a conventional bicycle frame. The hatched section shows how extra area for signage/advertising may be afforded by extending the down-tube and center panel of the frame under the bottom bracket.

As is shown in still an additional preferred mode of the device 10 in FIG. 8 and FIG. 9, the frame 12 may be formed of one type of material such as planar sheet metal, composite or square or round tubing, or may be configured as a hybrid frame as in FIGS. 8-11, using conventional tubing construction 36 in the frontal section engaged with sheet metal frame components 38 forming the rear of the frame 12. As shown in FIG. 9, the frame 12 according to this invention, through the provision of planar members 28 having a perimeter edge defining a shape that is complimentary to the interior of the formed aperture 23, especially when planar material forms the frame 12, yields much more employable space 33a for placement of indicia. Further, because the planar material if employed, extends to edges which do not obstruct the view of the aperture 23 as curved materials might, the area for indicia that may be discerned by third parties is further maximized.

Figure 10:
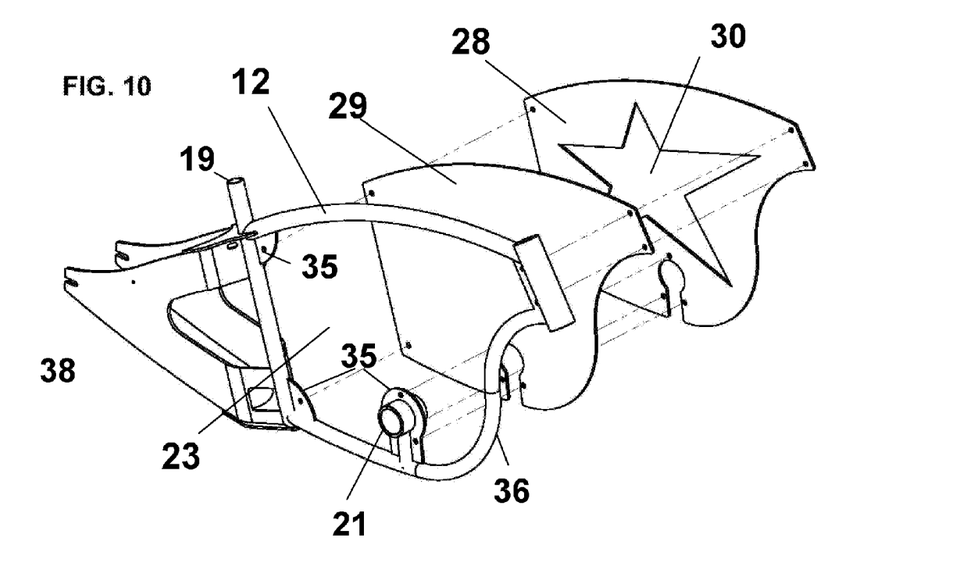
FIG. 10 is a view of the hybrid frame showing how the planar member may be cut to form indicia as apertures such as the displayed star and a center gusset may be engaged with the frame adjacent to the planar member.

The planar member 28 may be combined with an adjacent center panel 29 such as in FIG. 10 where the indicia 30 is formed by an aperture in the planar member 28 communicating through to the center panel 29. Further, should the center panel be substantially opaque, the indicia 30 will be viewed only from the side on which the planar member 28 is engaged, allowing the user to employ an additional planar member 28 with different indicia 30 on the opposite side providing means for a second concurrent advertisement or display.

Further, indicia 30 placed on the center panel 29, should the center panel 29 be substantially transparent, would be registered in engagement with the indicia 30 such that it would appear within the aperture forming the indicia 30 on the planar member 28 as well as the opposite side.

Figure 11:
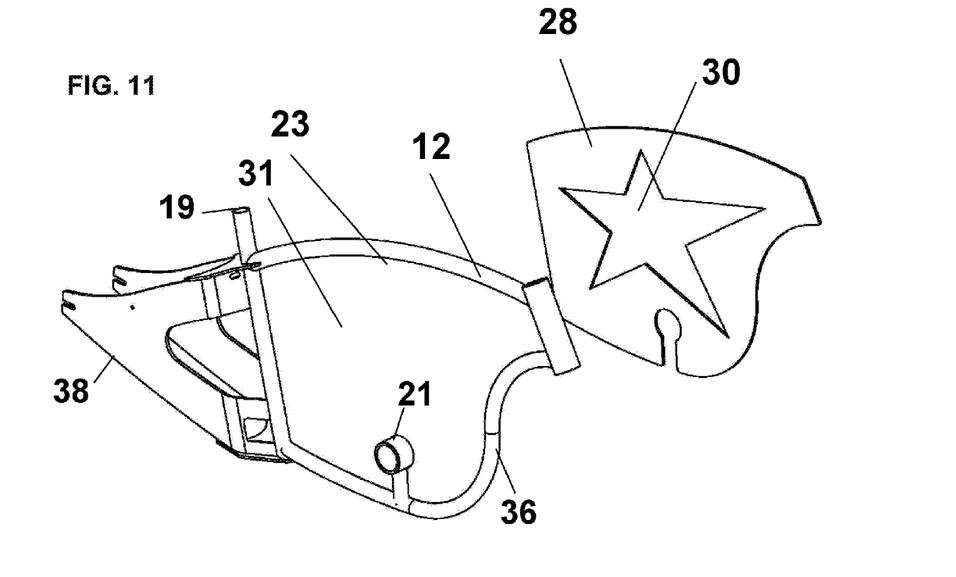
FIG. 11 is a view of a hybrid frame with the center gusset permanently placed when the frame is built.

Should extra frame support be desired, a center gusset 31 may be permanently engaged to the frame 12 thereby providing structural support rigidity to the frame 12. As such, the planar member 28 may be removably engaged thereby with the center gusset 31 such as via fasteners, adhesives, welding, or other means known in the art.

While all of the fundamental characteristics and features of the bicycle frame adapted for large indicia display herein, and employment thereof, have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the disclosed system and apparatus as defined by the following claims.

What is claimed is:

1. A bicycle frame for riding in an as-used position substantially vertical to a riding surface, comprising:
    a frame component, said frame component defining a shape of an aperture within an interior surface of a surrounding frame;
    said frame formed of a planar material, said planar material running between two opposing side edges, said planar material being substantially parallel to said riding surface with said frame in said as-used position;
    means for operative engagement of pedals in a communication with a lower portion of said frame, said pedals operatively engageable with a drive wheel rotationally engageable to a rear of said frame;
    means for operative engagement of a seat to an upper portion of said frame to support a rider;
    means for operative engagement of a front wheel rotatable by handlebars, to a front portion of said frame;
    a first planar member, said first planar member having a first surface and a second surface intersecting at a perimeter edge defining a first shape, said planar member in said first shape configured for a positioning within said frame;
    means to engage said first planar member in said positioning within said frame, to said frame, to an engaged position;
    said first planar member in said engaged position providing support to said surrounding frame as a means to prevent a distortion of said frame when under a load in said as used position.

2. The bicycle frame of claim 1, additionally comprising:
    said first shape being complimentary to said shape of said aperture thereby placing said perimeter edge of said first planar member in contact with or immediately adjacent to said interior surface of said frame.

3. The bicycle frame of claim 2, additionally comprising:
    an indicia placed upon one or both of said first surface and said second surface;
    said indicia discernable by a third party in a viewing of said bicycle while positioned on one side thereof while said bicycle is in said as-used position; and
    substantially all of said first surface and said second surface being unobstructed for said viewing by said two opposing side edges of said frame, thereby providing means to maximize an area for placement of said indicia.

4. The bicycle frame of claim 3, additionally comprising:
    said first planar member being removably engageable to said engaged position thereby allowing for a substitution of said first planar member with one or a plurality of other planar members similarly configured to said first planar member;
    said one or said plurality of other planar members respectively bearing different said indicia; and
    said substitution of said first planar member providing means to change said indicia.

5. The bicycle frame of claim 4, additionally comprising:
    said indicia being advertising whereby said substitution of said first planar member, or a subsequent other planar member, provides means to change said advertising.

6. The bicycle frame of claim 2, additionally comprising:
    said first planar member being removably engageable to said engaged position thereby allowing for substitution of said first planar member with another replacement planar member.

7. The bicycle frame of claim 1, additionally comprising:
an indicia placed upon one or both of said first surface and said second surface;
said indicia discernable by a third party in a viewing of said bicycle while positioned on one side thereof while said bicycle is in said as-used position; and
substantially all of said first surface and said second surface being unobstructed for said viewing by said two opposing side edges of said frame, thereby providing means to maximize an area for placement of said indicia.

8. The bicycle frame of claim 7, additionally comprising:
said first planar member being removably engageable to said engaged position thereby allowing for a substitution of said first planar member with one or a plurality of other planar members similarly configured to said first planar member;
said one or said plurality of other planar members respectively bearing different said indicia; and
said substitution of said first planar member providing means to change said indicia.

9. The bicycle frame of claim 8, additionally comprising:
said indicia being advertising whereby said substitution of said first planar member, or a subsequent other planar member, provides means to change said advertising.

10. The bicycle frame of claim 1, additionally comprising:
said first planar member being removably engageable to said engaged position thereby allowing for substitution of said first planar member with another replacement planar member.

11. A bicycle frame for riding in an as-used position substantially vertical to a riding surface, comprising:
a frame component, said frame component defining a shape of an aperture within an interior surface of a surrounding frame;
means for operative engagement of pedals in a communication with a lower portion of said frame, said pedals operatively engageable with a drive wheel rotationally engageable to a rear of said frame;
means for operative engagement of a seat to an upper portion of said frame to support a rider;
means for operative engagement of a front wheel rotatable by handlebars, to a front portion of said frame;
a first planar member, said first planar member having a first surface and a second surface intersecting at a perimeter edge defining a first shape, said planar member in said first shape configured for a positioning within said frame;
means to engage said first planar member in said positioning within said frame, to said frame, to an engaged position;
said first planar member in said engaged position providing support to said surrounding frame as a means to prevent a distortion of said frame when under a load in said as used position.

12. The bicycle frame of claim 11, additionally comprising:
said first shape being complimentary to said shape of said aperture thereby placing said perimeter edge of said first planar member in contact with or immediately adjacent to said interior surface of said frame.

13. The bicycle frame of claim 12, additionally comprising:
an indicia placed upon one or both of said first surface and said second surface;
said indicia discernable by a third party in a viewing of said bicycle while positioned on one side thereof while said bicycle is in said as-used position;
said first planar member in said engaged position being substantially within a plane also occupied by said frame; and
said first planar member in said engaged position being aligned with said frame when in said as-used position thereby providing means to aid in a balancing of said bicycle.

14. The bicycle frame of claim 12, additionally comprising:
an indicia placed upon one or both of said first surface and said second surface;
said indicia discernable by a third party in a viewing of said bicycle while positioned on one side thereof while said bicycle is in said as-used position;
said first planar member in said engaged position being substantially within a plane also occupied by said frame; and
said first planar member in said engaged position being aligned with said frame when in said as-used position thereby providing means to aid in a balancing of said bicycle.

15. The bicycle frame of claim 12, additionally comprising:
said first planar member being removably engageable to said engaged position thereby allowing for substitution of said first planar member with another replacement planar member.

16. The bicycle frame of claim 15, additionally comprising:
said first planar member being removably engageable to said engaged position thereby allowing for a substitution of said first planar member with one or a plurality of other planar members similarly configured to said first planar member;
said one or said plurality of other planar members respectively bearing different said indicia; and
said substitution of said first planar member providing means to change said indicia.

17. The bicycle frame of claim 11, additionally comprising:
said first planar member being removably engageable to said engaged position thereby allowing for substitution of said first planar member with another replacement planar member.

18. The bicycle frame of claim 17, additionally comprising:
said first planar member being removably engageable to said engaged position thereby allowing for a substitution of said first planar member with one or a plurality of other planar members similarly configured to said first planar member;
said one or said plurality of other planar members respectively bearing different said indicia; and
said substitution of said first planar member providing means to change said indicia.

* * * * *